No. 770,063. PATENTED SEPT. 13, 1904.
T. GINGRAS.
BELTING.
APPLICATION FILED JAN. 8, 1904.
NO MODEL.
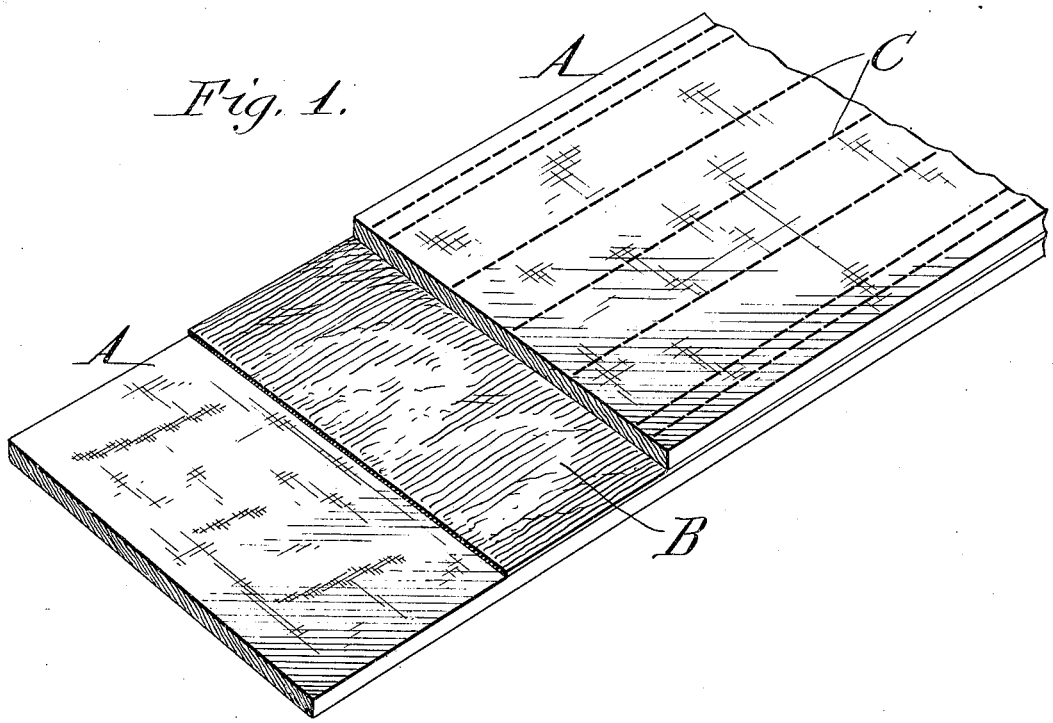
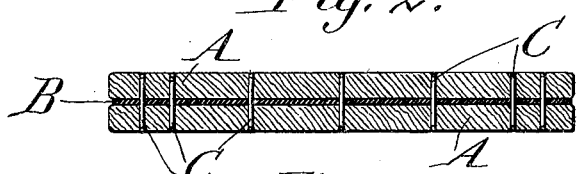
Witnesses:
Robert Weitknecht
Louis W. Gratz
Timothy Gingras
Inventor.
By Geyer & Popp
Attorneys.

No. 770,063.

Patented September 13, 1904.

UNITED STATES PATENT OFFICE.

TIMOTHY GINGRAS, OF BUFFALO, NEW YORK.

BELTING.

SPECIFICATION forming part of Letters Patent No. 770,063, dated September 13, 1904.

Application filed January 8, 1904. Serial No. 188,190. (No model.)

*To all whom it may concern:*

Be it known that I, TIMOTHY GINGRAS, a citizen of the United States, residing at Buffalo, in the county of Erie and State of New York, have invented new and useful Improvements in Belting, of which the following is a specification.

This invention relates to an improved belting for transmitting power, and more particularly to belts composed of layers of fabric.

The object of my invention is to produce a strong and durable belt of this character which is not liable to stretch and which possesses a high degree of resilience and flexibility.

In the accompanying drawings, Figure 1 is a sectional perspective view of a piece of my improved belting. Fig. 2 is a cross-section thereof. Fig. 3 is a section similar to Fig. 2, showing a belt in which the fabric layers each consist of a plurality of plies.

Similar letters of reference indicate corresponding parts in all the figures.

The belt consists of two separate layers A A of fabric, preferably cotton, woven with selvages at both edges, so that the belt has unfolded uniform edges. The layers of the belt may each be composed of one or more plies, according to the desired thickness of the belt; but in all cases it is desirable to employ but two layers having a like number of plies in order to preserve the requisite flexibility. Fig. 1 shows a belt in which each layer consists of a single ply, while Fig. 3 shows a belt in which each layer contains three plies.

The two fabric layers of the belt are united by an intermediate film or thin layer B of suitable adhesive material, the preferred cement being a composition of fish-glue and hide-glue in the proportion of one part of fish-glue to two parts of hide-glue. This uniting-film forms a cartilage-like layer of great strength, which in addition to forming a powerful binder stays the fabric, increases the strength of the belt, and prevents stretching and shrinkage of the same. It also possesses a high degree of flexibility and resilience, which permits the belt to conform readily to pulleys of comparatively small diameter and gives the same a tendency to assume its original position after passing around a pulley, thus providing a belt which combines the advantages of strength, durability, and minimum resistance in traveling over pulleys.

Besides cementing the fabric layers together they may be further united by rows of stitching C, extending lengthwise of the belt, as shown, and arranged from a quarter of an inch to one inch apart. Ordinarily this additional fastening is not necessary; but it is preferably employed in a belting exposed to moisture or to the weather.

In order to preserve the belt from decay and mildew and render it waterproof, the same is treated with a suitable filler which will practically withstand the effects of heat and moisture and yet not impair the strength of the belt. I prefer to use for this purpose a filler composed of equal parts of pine-tar and paraffin-wax or paraffin-oil. These ingredients are heated and thoroughly mixed, and the belt is treated therewith by dipping it in the mixture or by applying the latter to the belt with a brush. After being filled the belt may receive a finishing-coat of the same composition as the filler for giving it a smooth surface.

In manufacturing the belting the fabric layers are first stretched, and while under tension they are cemented together by the adhesive or cartilage-like film hereinbefore described. After properly drying and seasoning the cemented layers they are next stitched together, if stitching is employed, after which the belt is treated with the filler, which latter permeates the layers from both sides of the belt to the central binding-film B. When the filler is dry and well seasoned, the finishing-coat is applied to the belt.

I claim as my invention—

A belt comprising two separate layers of fabric having a like number of plies and treated with a filler composed of pine-tar and paraffin-wax, and a cartilage-like film of fish-glue and hide-glue arranged centrally between said two layers and uniting the same, substantially as set forth.

Witness my hand this 19th day of December, 1903.

TIMOTHY GINGRAS.

Witnesses:
CARL F. GEYER,
EMMA M. GRAHAM.